(12) United States Patent
Dwyer et al.

(10) Patent No.: US 7,021,771 B2
(45) Date of Patent: Apr. 4, 2006

(54) DISPLAY DEVICE FOR PROJECTING AN IMAGE ALTERNATIVELY ONTO A REMOTE SURFACE AND A REAR PROJECTION SCREEN

(75) Inventors: Dan R. Dwyer, BattleGround, WA (US); Howard G. Wong, Portland, OR (US); Robert M. Schneider, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 10/823,366

(22) Filed: Apr. 12, 2004

(65) Prior Publication Data

US 2005/0225733 A1    Oct. 13, 2005

(51) Int. Cl.
G03B 21/00     (2006.01)
G03B 21/14     (2006.01)
G03B 21/22     (2006.01)
G03B 21/56     (2006.01)
F16M 13/00     (2006.01)

(52) U.S. Cl. ............................ 353/79; 353/70; 353/71; 353/72; 353/119; 353/121; 248/923; 359/460

(58) Field of Classification Search ................. 353/69, 353/70, 71, 72, 79, 80, 100, 101, 119, 121; 248/917, 919, 920, 921, 922, 923, 838; 348/836, 348/842, 838; 352/104; 359/460, 443, 461, 359/463

See application file for complete search history.

(56) References Cited

U.S. PATENT DOCUMENTS

| 4,030,821 | A |   | 6/1977  | Badalich et al. ............... 353/71 |
| 4,572,632 | A |   | 2/1986  | Bodier et al. .................. 353/71 |
| 4,755,881 | A | * | 7/1988  | Bartlett ....................... 348/838 |
| 5,510,862 | A | * | 4/1996  | Lieberman et al. ......... 353/119 |
| 5,895,110 | A | * | 4/1999  | Okada et al. .................. 353/31 |
| 6,233,024 | B1 | * | 5/2001 | Hiller et al. ................. 348/744 |
| 6,334,687 | B1 | * | 1/2002 | Chino et al. .................. 353/79 |
| 6,637,896 | B1 | * | 10/2003 | Li et al. ..................... 353/119 |
| 2004/0141157 | A1 | * | 7/2004 | Ramachandran et al. ..... 353/70 |

FOREIGN PATENT DOCUMENTS

| JP | 03041493 | 2/1991 |
| JP | 05224300 | 9/1993 |
| JP | 09236871 | 9/1997 |

OTHER PUBLICATIONS

European Search Report dated Jul. 21, 2005.

* cited by examiner

*Primary Examiner*—Melissa Jan Koval

(57) ABSTRACT

A display device projects an image alternatively onto a remote surface and a rear projection screen. The display device has a base, a projector, a rear projection screen, and a mirrored surface. The projector is affixed to the base. The rear projection screen is mounted on the base. The housing extends rearward of the rear projection screen and has an opening formed therein. The mirrored surface is angled to reflect light from the projector onto the rear projection screen. The rear projection screen and the housing are pivotal on the base. In one position, the projector is exposed for projection onto the remote surface. In another position, the projector is engaged within the opening for projection through the opening at the mirrored surface.

23 Claims, 5 Drawing Sheets

DISPLAY DEVICE FOR PROJECTING AN IMAGE ALTERNATIVELY ONTO A REMOTE SURFACE AND A REAR PROJECTION SCREEN

FIELD OF THE INVENTION

This invention relates in general to combination rear projection displays and projectors and, more particularly, to a display device for projecting an image alternatively onto a remote surface and a rear projection screen.

BACKGROUND OF THE INVENTION

Rear projection display devices and projector display devices are useful for displaying images and video streams. Examples of their uses include television and presentations. Although these two types of display devices are similar, they are not identical. It is often desirable to have both a rear projection display device and a projector display device in order to take advantage of the best qualities of each.

Owning one of each type of these display devices is more expensive and requires a larger amount of space than owning only one of these devices. Many times, this requires consumers of display devices to choose between having a rear projection display device and having a projector display device. Once the choice is made, the consumer is unable to take advantage of the best qualities of the device not chosen, unless the consumer acquires that other device.

SUMMARY OF THE INVENTION

According to principles of the present invention, in one embodiment, a display device projects an image alternatively onto a remote surface and a rear projection screen. The display device has a base, a projector, a rear projection screen, and a mirrored surface. The projector is affixed to the base. The rear projection screen is mounted on the base. The housing extends rearward of the rear projection screen and has an opening formed therein. The mirrored surface is angled to reflect light from the projector onto the rear projection screen. The rear projection screen and the housing are pivotal on the base. In one position, the projector is exposed for projection onto the remote surface. In another position, the projector is engaged within the opening for projection through the opening at the mirrored surface.

DETAILED DESCRIPTION OF THE INVENTION

Figure 1:
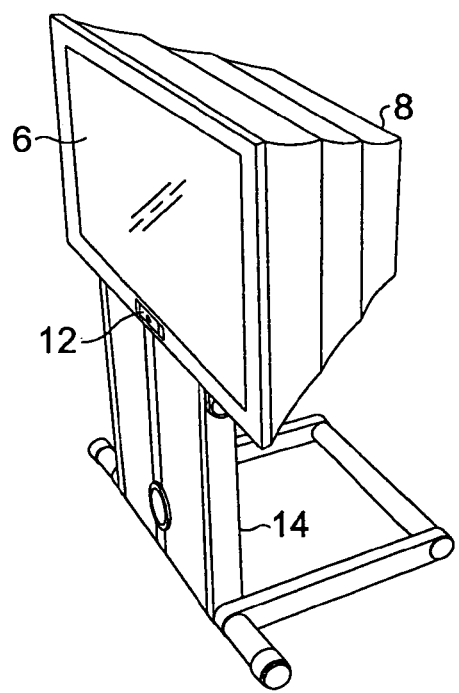
FIG. 1 is a front orthogonal diagram illustrating a first position of one embodiment of the present invention display device for projecting an image alternatively onto a remote surface and a rear projection screen.
Figure 2:
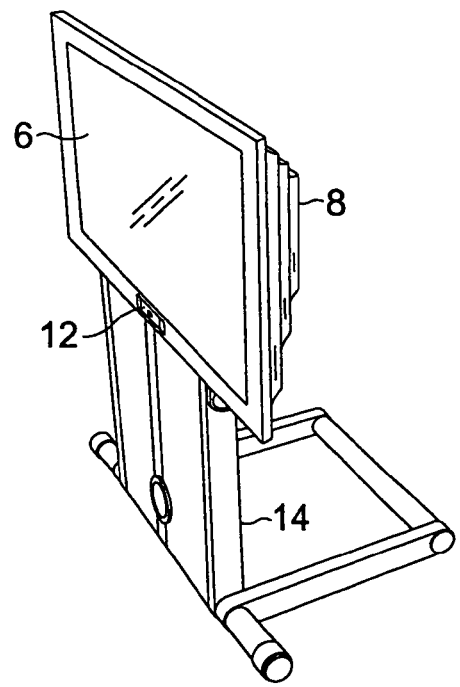
FIG. 2 is a front orthogonal diagram illustrating the display device of FIG. 1 with a collapsed housing.
Figure 3:
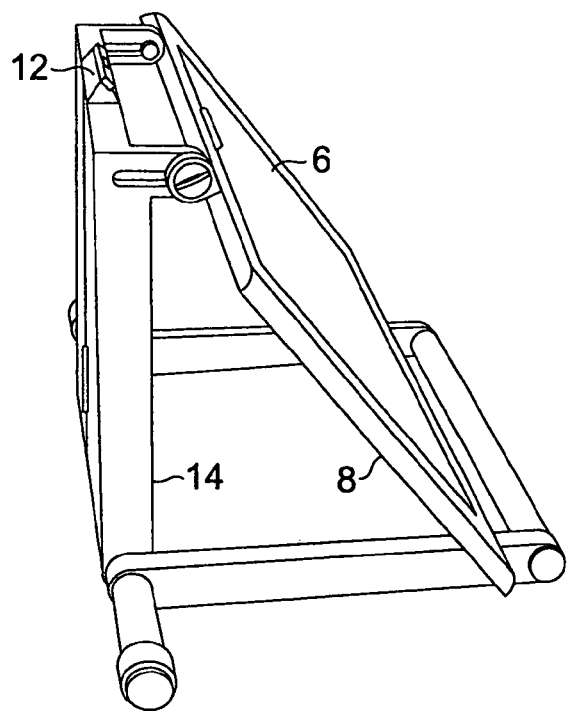
FIG. 3 is a front orthogonal diagram illustrating a second position of the display device shown in FIG. 1.

FIGS. 1–6 illustrate an embodiment of display device 2. Display device 2 selectively projects an image onto remote surface 4 and rear projection screen 6. In one embodiment, display device 2 includes rear projection screen 6, housing 8, mirrored surface 10, projector 12, and base 14.

Rear projection screen 6 is any screen useful for receiving a projection on one side and transmitting the projection through to its other side. Rear projection screen 6 is any suitable size. Examples of suitable sizes range from 30 inches to 40 inches. Although, other sizes may be suitable as well. Rear projection screen 6 is mounted on base 14. In one embodiment, rear projection screen 6 is detachable from base 14.

Housing 8 extends rearward of rear projection screen 6 and encloses mirrored surface 10 and one side of rear projection screen 6. Housing 8 is collapsible. Housing 8 is either constructed of a collapsible material or configured to fold onto itself to collapse.

Projector 12 is affixed to base 14 and concealable within housing 8 through opening 16. In one configuration, projector 12 projects into housing 8 through opening 14 onto mirrored surface 10. In another configuration, projector 12 projects onto remote surface 4. Remote surface 4 is any suitable distance from projector 12 and projector 12 projects an image of any suitable size onto remote surface 4. Examples of suitable sizes include 80 inches and over. Although sizes of less than 80 inches may also be suitable.

In one embodiment, projector 12 includes lens 18. Lens 18 is adjustable to focus selectively on rear projection screen 6 and remote surface 4 depending on the configuration of display device 2.

Figure 4:
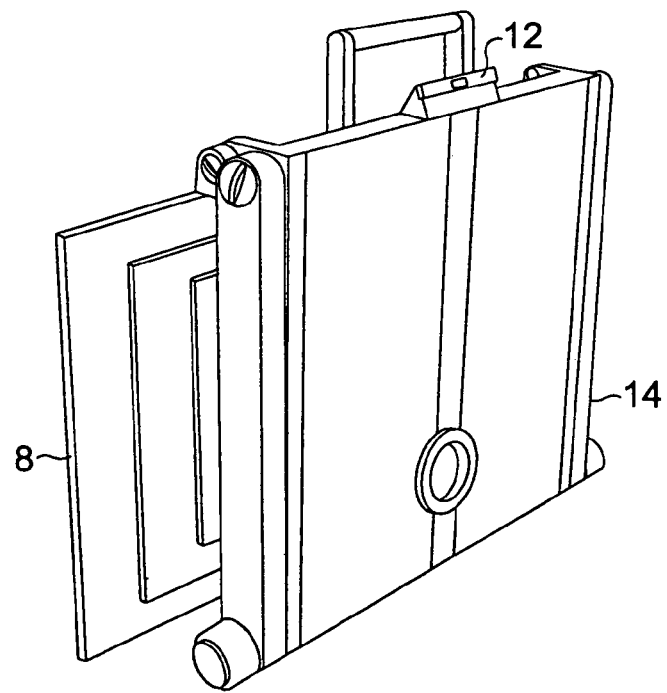
FIG. 4 is a front orthogonal diagram illustrating a retracted position of the display device shown in FIG. 1.
Figure 5:
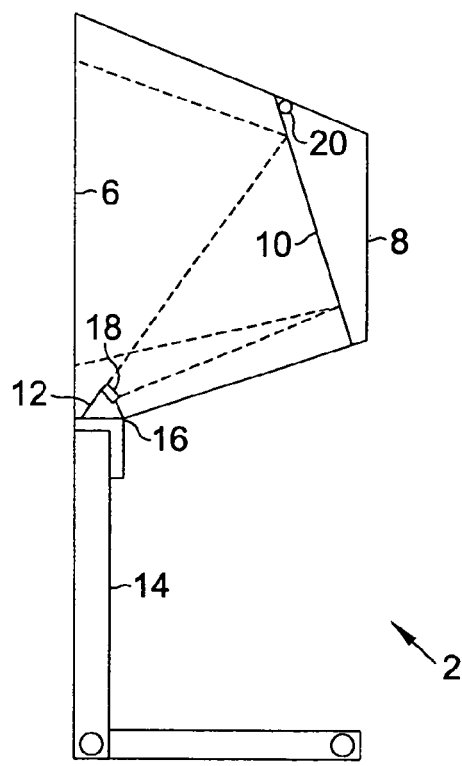
FIG. 5 is a cross-sectional illustration of one embodiment of the display device in the position shown in FIG. 1.
Figure 6:
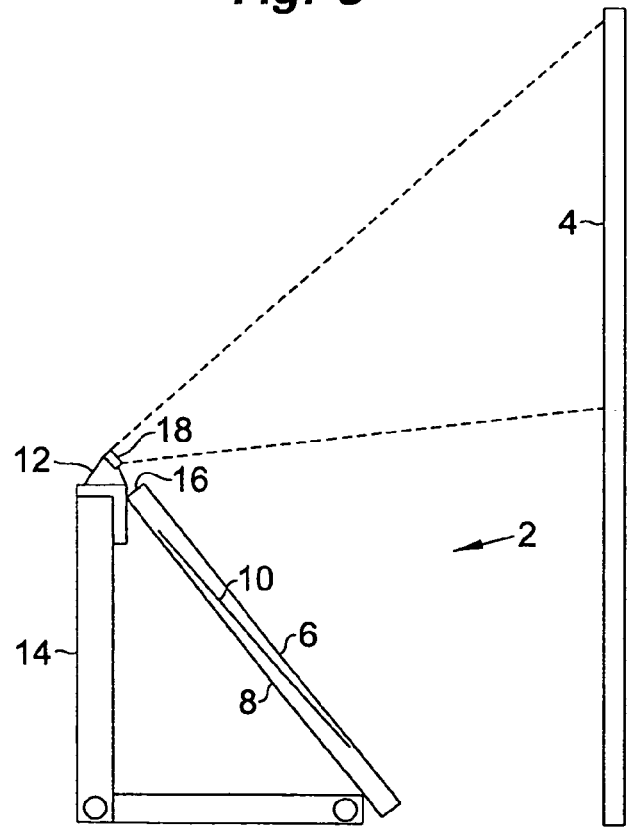
FIG. 6 is a cross-sectional illustration of one embodiment of the display device in the position shown in FIG. 3.

Base 14 is any suitable structure for supporting projector 12, rear projection screen 6 and housing 8. The Figures represent only one exemplary structure, a foldable "L" shaped structure, for base 14. Many alternative structures are also suitable for base 14. Additionally, base 14 may be further collapsed, as shown in FIG. 4, for portability or storage.

In one embodiment, display device 2 further includes a handle 19. Handle 19 is mounted in any location on display device 2. Examples of locations suitable for mounting handle 19 include housing 8 and base 14. Handle 19 allows display device 2 to be conveniently carried.

Rear projection screen 6 and housing 8 are pivotal on base 14 for selectively exposing projector 12 for projection onto remote surface 4 and engaging projector 12 within opening 16 for projection through opening 16 at mirrored surface 10.

Opening 16 is formed in housing 8. Opening 16 allows projector 12 to project into housing at mirrored surface 10.

Mirrored surface 10 is any light reflecting surface. Mirrored surface 10 is disposed within housing 8 and angled to reflect light from projector 12 onto rear projection screen 6. Although only one mirrored surface 10 is illustrated in the Figures, any number of mirrored surfaces 10 may be used to channel the light from projector 12 onto rear projection screen 6. Additionally, mirrored surface 10 may be attached at either or both ends of mirrored surface 10.

In one embodiment, display device 2 further includes support structure 20 for mirrored surface 10. Support structure 20 is any device or system configured to support mirrored surface 10 within housing 8. Examples of support structure 20 include tracks and tethers. In one embodiment, support structure 20 is collapsible within housing 8. Although illustrated on only one end of mirrored surface 10, support structure 20 may be at wither or both ends.

Figure 7:
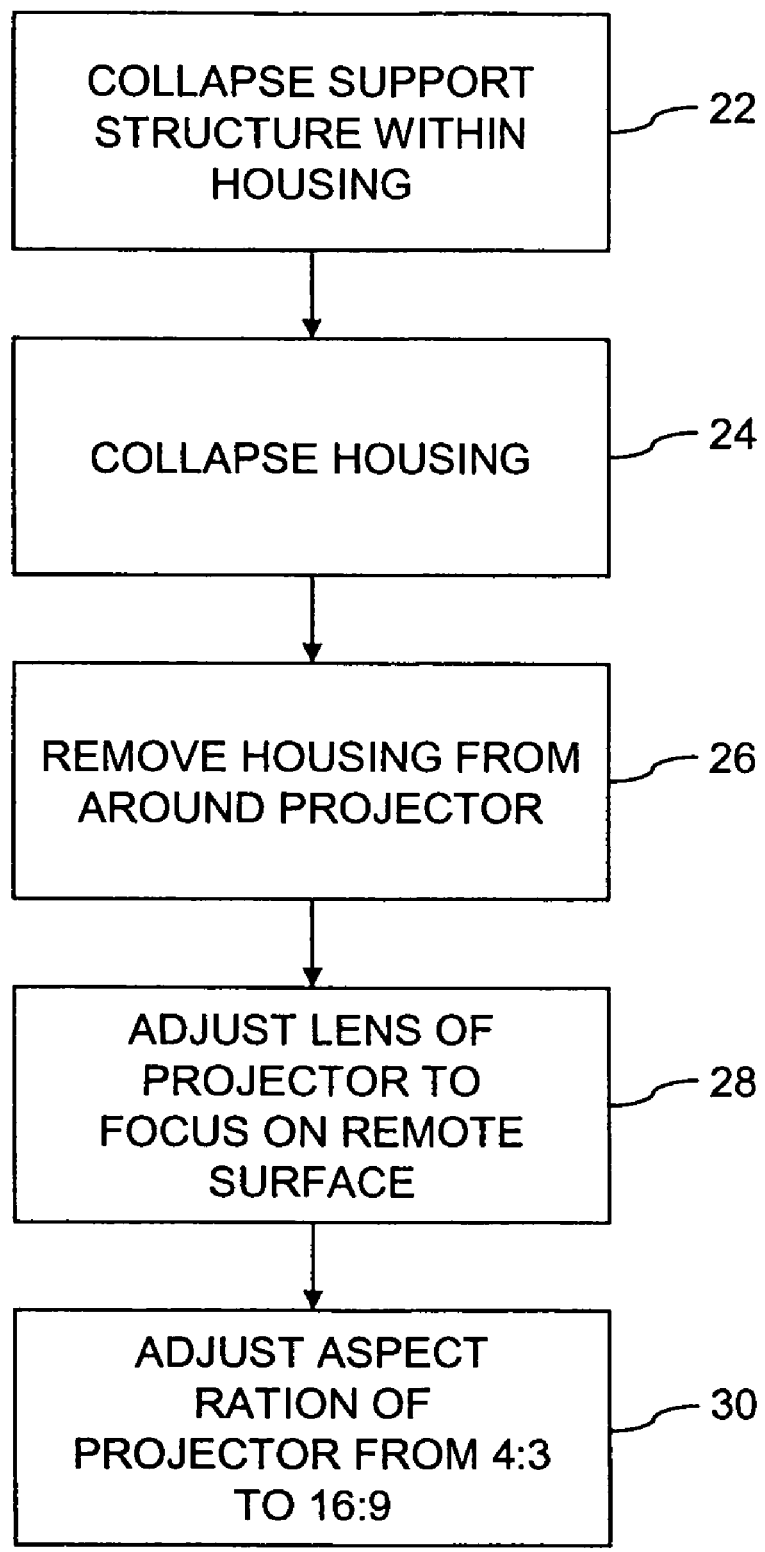
FIG. 7 is a flow chart illustrating one embodiment of the present invention method for converting a display device from a rear projection display device into a front projection display device.

FIG. 7 is a flow chart representing steps of one embodiment of the present invention method for converting display device 2 from a rear projection display device into a front projection display device. Although the steps represented in FIG. 7 are presented in a specific order, the present invention encompasses variations in the order of steps. Furthermore, additional steps may be executed between the steps illustrated in FIG. 7 without departing from the scope of the present invention.

Support structure 20 for mirrored surface 10 is collapsed 22 within housing 8 of display device 2. The exact means for collapsing 22 support structure 20 depends on the nature of support structure 20.

Housing 8 of display device 2 is collapsed 24. Housing 8 is removed 26 from around projector 12. In one embodiment, removing 26 housing 8 from around projector 12 includes pivoting rear projection screen 6 and housing 8 on base 14. In an alternate embodiment, removing 26 housing 8 from around projector 12 includes removing rear projection screen 6 and housing 8 from base 14.

Additional optional steps may be implemented. For example, in one embodiment, lens 18 of projector 12 is adjusted 28 to focus on remote surface 4. In another optional step, an aspect ratio of projector 12 is adjusted 30 between 4:3 and 16:9.

Figure 8:
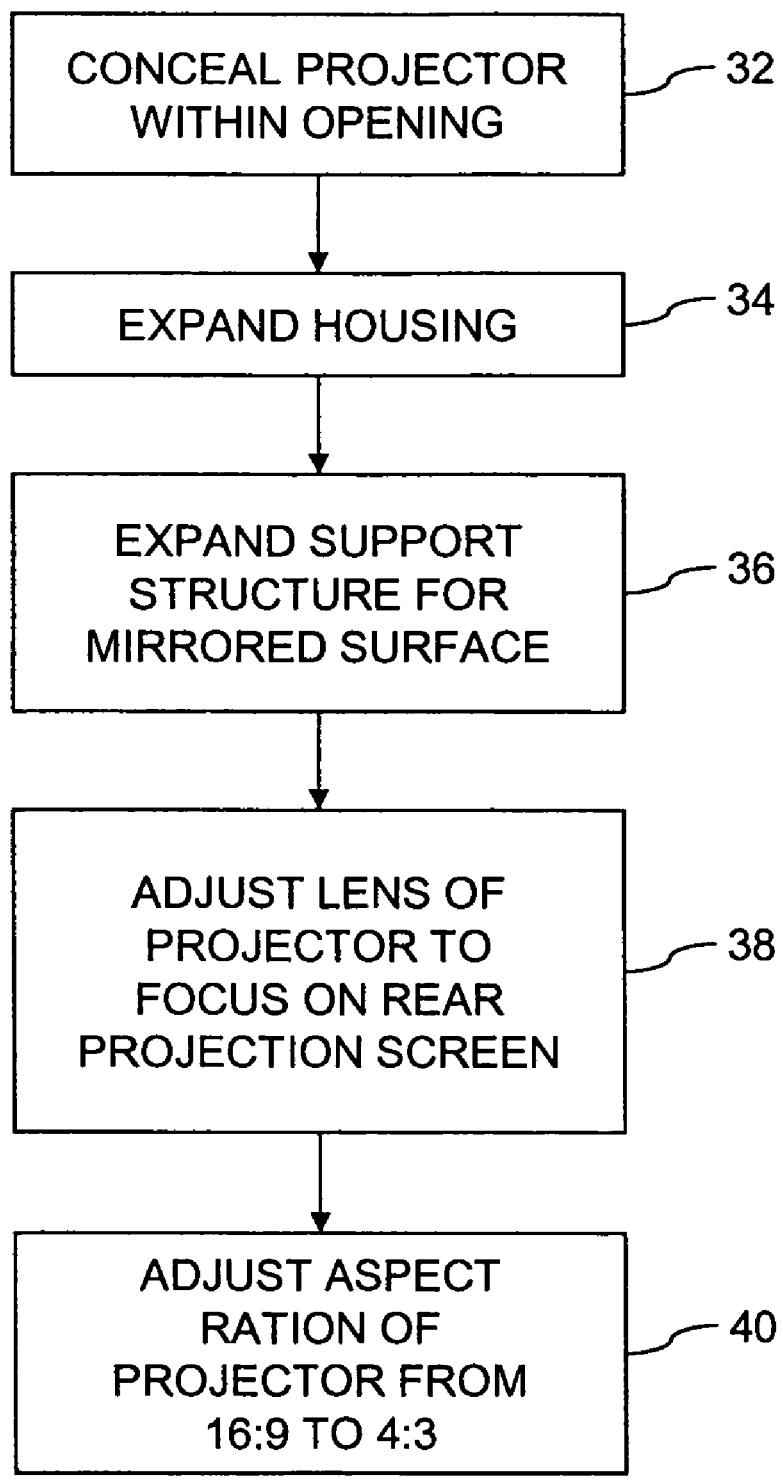
FIG. 8 is a flow chart illustrating one embodiment of the present invention method for converting a display device from a front projection display device into a rear projection display device.

FIG. 8 is a flow chart representing steps of one embodiment of the present invention method for converting display device 2 from a front projection display device into a rear projection display device, reversing the sequence and effect of the steps in FIG. 7. Although the steps represented in FIG. 8 are presented in a specific order, the present invention encompasses variations in the order of steps. Furthermore, additional steps may be executed between the steps illustrated in FIG. 8 without departing from the scope of the present invention.

Projector 12, supported in base 14 of display device 2 is concealed 32 within housing 8 of display device 2. In one embodiment, concealing 32 projector 12 within housing 8 includes pivoting rear projection screen 6 and housing 8 on base 14. In an alternative embodiment, concealing 32 projector 12 within housing 8 includes installing rear projection screen 6 and housing 8 onto base 14.

Housing 8 of display device 2 is expanded 34. Support structure 20 for mirrored surface 10 is expanded to align mirrored surface 10 with rear projection screen 6.

Additional optional steps may be implemented. For example, in one embodiment, lens 18 of projector 12 is adjusted 38 to focus on rear projection screen 6. In another optional step, an aspect ratio of projector 12 is adjusted 40 between 16:9 and 4:3.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A display device for projecting an image alternatively onto a remote surface and a rear projection screen, the display device comprising:

a base;

a projector affixed to the base;

a rear projection screen mounted on the base;

a housing extending rearward of the rear projection screen, the housing having an opening formed therein;

a mirrored surface within the housing, the mirrored surface angled to reflect light from the projector onto the rear projection screen; and wherein the rear projection screen and the housing are pivotal on the base for selectively exposing the projector outside the housing for projection onto the remote surface and engaging the projector within the opening to conceal the projector within the housing for projection at the mirrored surface.

2. The display device of claim 1 wherein the housing is collapsible.

3. The display device of claim 2 further including a support structure for the mirrored surface, wherein the support structure is collapsible within the housing.

4. The display device of claim 1 wherein the rear projection screen is detachable from the base.

5. The display device of claim 1 wherein the projector includes a lens adjustable to focus selectively on the rear projection screen and the remote surface.

6. A display device for projecting an image alternatively onto a remote surface and a rear projection screen, the display device comprising:

a base;

a projector affixed to the base;

a rear projection screen mounted on the base;

a housing extending rearward of the rear projection screen, the housing having an opening formed therein;

means for reflecting light emitted into the housing from the projector onto the rear projection screen; and means for selectively exposing the projector outside the housing for projection onto the remote surface and engaging the projector within the opening to conceal the projector within the housing for projection at the means for reflecting light.

7. The display device of claim 6 wherein the means for selectively exposing the projector and engaging the projector within the opening includes means for pivoting the rear projection screen and the housing on the base.

8. The display device of claim 6 wherein the means for selectively exposing the projector and engaging the projector within the opening includes means for removing the rear projection screen and the housing from the base.

9. The display device of claim 6 further including means for collapsing the housing.

10. The display device of claim 6 wherein the rear projection screen is detachable from the housing.

11. The display device of claim 6 further including collapsible means for supporting the means for reflecting light.

12. The display device of claim 6 further including means for focusing light emitted from the projector selectively on the rear projection screen and the remote surface.

13. The display device of claim 6 further including means adjusting an aspect ratio of the projector between 4:3 and 16:9.

14. A method for converting a display device from a rear projection display device into a front projection display device, the method comprising:

collapsing a support structure for a mirrored surface within a housing of the display device;

collapsing a housing of the display device;

removing the housing from around a projector supported in a base of the display device so that the projector is exposed for projection onto a remote surface.

15. The method of claim 14 wherein removing the housing from around the projector includes pivoting a rear projection screen and the housing on the base.

16. The method of claim 14 wherein removing the housing from around the projector includes removing a rear projection screen and the housing from the base.

17. The method of claim 14 further including adjusting a lens of the projector to focus on a remote surface.

18. The method of claim 14 further including adjusting an aspect ratio of the projector from 4:3 to 16:9.

19. A method for converting a display device from a front projection display device into a rear projection display device, the method comprising:

concealing a projector, supported in a base of the display device, within a housing of the display device;

expanding the housing of the display device; and expanding a support structure for a mirrored surface within the housing so that the projector concealed within the housing is positioned for projection at the mirrored surface.

20. The method of claim 19 wherein concealing the projector within the housing includes pivoting a rear projection screen and the housing on the base.

21. The method of claim 19 wherein concealing the projector within the housing includes installing a rear projection screen and the housing onto the base.

22. The method of claim 19 further including adjusting a lens of the projector to focus on a rear projection screen.

23. The method of claim 19 further including adjusting an aspect ratio of the projector from 4:3 to 16:9.

* * * * *